(12) United States Patent  (10) Patent No.: US 7,810,166 B2
Struckmeier et al.  (45) Date of Patent: Oct. 5, 2010

(54) DEVICE AND METHOD FOR SCANNING PROBE MICROSCOPY

(75) Inventors: Jens Struckmeier, Dresden (DE); Karl Schlagenhauf, Karlsruhe (DE)

(73) Assignee: Nambition GmbH (DE)

( * ) Notice: Subject to any disclaimer, the term of this patent is extended or adjusted under 35 U.S.C. 154(b) by 220 days.

(21) Appl. No.: 11/576,724

(22) PCT Filed: Sep. 30, 2005

(86) PCT No.: PCT/EP2005/010604

§ 371 (c)(1),
(2), (4) Date: Apr. 5, 2007

(87) PCT Pub. No.: WO2006/040025

PCT Pub. Date: Apr. 20, 2006

(65) Prior Publication Data

US 2008/0072665 A1   Mar. 27, 2008

(30) Foreign Application Priority Data

Oct. 7, 2004 (DE) .................... 10 2004 048 971

(51) Int. Cl.
  *G01Q 60/00* (2010.01)
  *G01Q 60/24* (2010.01)
  *G01Q 10/00* (2010.01)
  *G01Q 20/00* (2010.01)
(52) U.S. Cl. .................. 850/21; 850/1; 850/5; 850/33
(58) Field of Classification Search .................. 73/105; 850/1, 5, 21, 33
See application file for complete search history.

(56) References Cited

U.S. PATENT DOCUMENTS 5,515,719 A   5/1996  Lindsay (Continued)

FOREIGN PATENT DOCUMENTS

DE   9421715 U1 *  7/1996

(Continued)

OTHER PUBLICATIONS

Raster—Definition from the Merriam-Webster Online Dictionary, 2 pages, main entry dated 1934, downloaded Dec. 31, 2009 from http://www.merriam-webster.com/dictionary/raster.*

(Continued)

*Primary Examiner*—Thomas P Noland
(74) *Attorney, Agent, or Firm*—Hooker & Habib, P.C.

(57) ABSTRACT

The invention relates to a device for scanning probe microscopy, said device comprising a scanning microscopy measuring device provided with a measuring probe for scanning microscopy measurements and a sample carrier for receiving a sample to be measured by scanning microscopy; a control device which is connected to the scanning microscopy measuring device in such a way that it is integrated into the system, and is designed in such a way as to automatically control the measuring device in order to perform a scanning microscopy measurement according to pre-defined control parameters; and/or an evaluation device that is connected to the scanning microscopy measuring device in such a way that it is integrated into the system, and is designed in such a way as to automatically evaluate measurements according to pre-defined evaluation parameters.

8 Claims, 3 Drawing Sheets

U.S. PATENT DOCUMENTS

| | | | | |
|---|---|---|---|---|
| 5,825,670 A | * | 10/1998 | Chernoff et al. | 73/105 X |
| 5,834,644 A | | 11/1998 | Shao et al. | |
| 5,994,820 A | * | 11/1999 | Kleindiek | 310/329 |
| 6,051,833 A | * | 4/2000 | Yasutake | 850/3 |
| 6,079,254 A | | 6/2000 | Chen et al. | |
| RE37,560 E | * | 2/2002 | Elings | 310/316.01 |
| 6,880,386 B1 | * | 4/2005 | Krotil et al. | 73/105 |
| 6,941,798 B2 | * | 9/2005 | Yamaoka et al. | 73/105 |
| 6,985,223 B2 | * | 1/2006 | Drachev et al. | 850/33 X |
| 7,456,400 B2 | * | 11/2008 | Shigeno et al. | 73/105 X |
| 2004/0031315 A1 | * | 2/2004 | Shuman | 73/105 |
| 2005/0050947 A1 | * | 3/2005 | Kitajima et al. | 73/105 |

FOREIGN PATENT DOCUMENTS

| | | | |
|---|---|---|---|
| DE | 19502822 A1 | * | 8/1996 |
| DE | 19700747 A1 | * | 7/1998 |
| JP | 06 291315 A | | 7/1994 |
| WO | WO 00/79290 A1 | * | 12/2000 |
| WO | WO-03050821 A | | 6/2003 |
| WO | WO-03094173 A | | 11/2003 |

OTHER PUBLICATIONS

C.S. Cook et al., Automated analysis of data mark microstructure of various media in the Optical Disk Industry, 2000, Proceedings of SPIE, vol. 4090, pp. 16-25.

J.P. Bearinger et al., Direct observation of hydration of Ti02 on Ti using electrochemical AFM: freely corroding versus potentiostatically held, 2001, Surface Science 491, pp. 370-387.

T.S. Spisz et al., Automated Sizing of DNA fragments in atomic formce microscope images, 1988, Medical & Biological Engineering & Computing 36, pp. 667-682.

M. Kuehn et al., Automated Confocal Laser Scanning Microscopy and SemiAutomated Image Processing for Analysis of Biofilms, 1988, Applied and Environmental Microbiology 64, pp. 4115-4127.

T. Wade et al., A simple modification of a commercial force microscopy liquid cell for in situ imaging in organic, reactive, or air sensitive environments, 1999, Review of Scientific Instruments 70, pp. 121-124.

S. Zepeda et al., Atomic force microscope chamber for in situ studies of ice, 2001, Review of Scientific Instruments 72, pp. 4159-4163.

* cited by examiner

DEVICE AND METHOD FOR SCANNING PROBE MICROSCOPY

SCOPE OF THE INVENTION

The present invention encompasses, in general, apparatuses and methods for the investigation of biological systems, wherein such systems are involved which are enabled to be carried out by means of scanning probe microscopic methods and by special applications of force-spectroscopic research, where scanning covers a raster patterned area.

BACKGROUND OF THE INVENTION

Biological systems and the processes which operate therein or are caused to so operate have their basic foundation on the interaction of molecules. Molecular forces in biological systems are different from other molecular systems where chemical reactions and changes of physical phases in a complete system are concerned. Statements about molecular interactive activity in biological systems bring forward the advantageous concept that such systems could be analyzed in order to be able in the future to formulate statements in greater detail.

For the measurement of molecular interchange in biological systems, among other methods, raster type scanning, based on probe centered, microscopic methods are in frequent use, in order to make determinations regarding the topographic characteristics of surfaces by using high lateral and vertical resolution. In regard to "lateral resolution", is to be understood that resolution in a single plane of a surface under investigation in a biological system is meant, while correspondingly, the resolution perpendicularly aligned thereto is designated as "vertical resolution".

Examples for raster-scanning probe microscopic applications encompass such procedures as may be found in, for instance, SFM (scanning force microscopy) or again in AFM (atomic-force microscopy).

With such scanning probe microscopy applications, it is possible, that besides the topology of a surface of a biological sample, also the elasticity thereof or the thereto applicable adhesion forces can be determined. The scanning probe microscopy, here normally referred to as a "force-spectroscopy", determines molecular forces of the sample by means of an analytic probe which invades or reacts with the said sample, in order to quantitatively detect and characterize the interactive exchange between individual molecules. Customarily, a probe includes a measuring tip, which is carried on a freely extending arm or is supported in a cantilever fashion. When being used in an analysis, the probe assembly is measurably caused to crisscross over the surface of a sample, during which action, the lateral and vertical positions and/or deflections of a probe can be recorded. Movements of a probe relative to the sample are possible due to the elasticity of a probe itself and especially the characteristics of the said cantilever holder thereof. Based on lateral and vertical positioning and/or deviations of a probe, molecular forces inherent in the sample and the therefrom induced topographical characteristics can be determined.

Customarily, movements of a probe are detected by optical measuring instruments, wherein the resolution stands at about 0.1 nm and permit a determination of forces in the range of a few pN (pico-Newton).

In order to determine the surface topography of a biological sample, the surface of the sample and the probe of the said force-microscopic procedure can be so mutually counter positioned, that a force, acting between them can be brought to a predetermined value (nominally about 50 to 100 pN). Accordingly, a probe and the sample are so placed, relative to one another, that a crisscross (raster) scan of the surface of the sample is enabled. In this way, the sample and/or the probe can move also vertically, so that the forces acting between them are purposely retained within the predetermined values. Movements of the sample and probe relative to one another can be activated by means of a piezoelectric ceramic device.

One advantage of the scanning force-microscopy can be found therein, in that biological samples in buffered solutions held at a relevant physiological temperature (namely 4° C. and 60° C.) can be investigated.

FIG. 1 illustrates, in a simplified way, the principal of a scanning force microscope. For the analysis of the surface of a biological sample BP a probe S is employed. A probe S can be considered to be a probe-tip Sp, which is suspended from a spring C. In a case of movement of a probe S and the biological sample BP relative to one another, (for example along the path W), dependent upon the respective surface topography, a probe S and the sample SP are so mutually displaced in relation to one another in a vertically designated direction, that the displacement of the spring C remains constant.

At the present time, scanning probe microscopy, however, presents a task which is time consuming and intensive of personal attention. Actually, a great number of measurement increments, are necessary for a well founded analysis. For this reason, present applications of scanning probe microscopy are entirely unsatisfactory, due to the small number of measurements made, for instance, per day. Also the limited possibilities of the analyses, of the evaluation and the subsequent use of the measured data, present considerable disadvantages.

PURPOSE OF THE INVENTION

The purpose of the invention is to make available a device and method, whereby the disadvantages of known scanned probe microscopy applications, especially in regard to personal attention and time requirements are set aside and the necessary measurements for a soundly based investigation of biological samples become available. Further, the present invention is to enable that data acquired by raster scanned probe microscopy methods can be put to use in an improved manner, which exceeds in quality, that done within the state of the technology.

ABSTRACT OF THE INVENTION

For the achievement of the above stated purpose as well as for the carrying out of the same, the present invention requires an apparatus for raster scanned, probe microscopy as well as a method for the execution of a scanning probe microscopy measurement in accord with the independent claims 1 and 32. Advantageous embodiments become evident in the subordinate claims, the description which follows and are shown in the attached drawings.

The invented apparatus serves for scanning probe microscopy and encompasses a scanning microscopy measuring instrument. The said measuring instrument includes a measuring probe for the said scanning probe microscopy measurements and a probe carrier for the manipulation of a scanning probe in action. Further, a control device and/or an evaluation unit is provided.

The control device is integrated into the system, that is to say, is an integrated component of the invented apparatus and bound to the raster oriented scanning probe microscopic equipment. The control device is intended to regulate the said measuring device for the automatic execution of a scanned probe microscopic analysis in accord with predetermined control parameters.

Likewise, the evaluation unit is system integrated and bound to the scanning probe microscopy equipment. This said unit also forms an integral part of the invented apparatus and is designed to automatically evaluate measurements acquired by means of the scanning probe microscopy method in accord with the predetermined evaluation parameters.

With the invented apparatus, a physical setup is prepared for the automatic carrying out of investigations of biological samples by means of scanning probe microscopy methods and/or to execute and record the evaluations of the same. Further, the invented apparatus is to possess the ability to cause the said measurements to be in accord with the investigative probe and to be expressed in terms compliant with the system employed, so that appropriate parameters for control and evaluation can be used. One advantage which arises from this arrangement is that such measurements can be acquired and analyzed without personal intervention throughout an entire day.

Advantageously, the control device and/or the evaluation unit is designed to recognize readings of the measurement equipment and/or the evaluation unit to obtain data for the determination of input parameters or parameter-sets of the measured values. This feature can also serve as a backup source for data available from measurements of the said measurement and/or evaluation unit for control or evaluation parameters.

The identification of parameters or parameter-sets can be carried out under the use of iterative "search algorithms", i.e. algorithms characterized to identify specified expressions being searched for. Further, it is possible, that at least in regard to this feature, the control device and the evaluation unit should be interconnected. In the case of one embodiment example, the evaluation unit analyzes the force-spectroscopic data during the course of an experiment. Upon the attainment of significant number of data inputs, the subsequent experimental parameters were included and the experiment carried forward. The experimental parameters can, in this way, be changed in such a manner, that, for example, the changes in the measured forces, which changes were actually measured, (along with the attendant energies and binding constants) can be determined with greater precision. In this way, for example, it becomes possible for the researching person to automatically examine interesting areas of molecular interaction.

This embodiment of the invented apparatus provides the possibility, as will be more completely described in the following, that measurements and samples can be classified, measurements on one probe can be compared with one another, optimized measurement strategies can be developed and/or immediately applied as well as the measurement strategies currently used can be optimized.

Advantageously, this apparatus encompasses a data storage memory for the storage of the data acquired from the evaluation unit, which data arise from an evaluation of measurements by means of the rasterized scanned microscopic measurement device. This embodiment allows, for example, the construction of a data-bank with information including the measurements on samples which have been examined by rasterized scanning probe microscopy. The advantage is, that with the said data storage memory, it is possible, during or following, a current series of measurements, data can be retrieved for reference. The data storage memory can also be used for the retrieval of completed measurement results, whereby comparisons may be made with data currently being input to the said memory.

Advantageously, the data retrieval memory is designed in such a manner, that the respective conditions of measurement methods for the specified control parameters and/or for the given evaluation parameters and/or for the current measurement can be so captured, that an unambiguous information-linkage to the currently corresponding data from the evaluation unit can be achieved.

In the case of an advantageous embodiment, a probe possesses a resilient element namely a spring or the like. The said resilient element can employ an unrestricted, pivotal arm or a cantilever extension as its active structure. With this type of construction, further provision can be made, that the forces at the measurement device, which act upon a probe can be calculated.

In the case of a continued development of the invented embodiment, so provided with the said resilient element, provision can now be made that the measurement device experiences alternating action between a probe and the sample on the basis of which, the forces acting upon a probe can be determined by the application of an optical measurement system (for instance, a laser beam deflection system, i.e. "beam bouncing") and/or by means of piezo-electrical effects and/or the employment of magnetic effects arising from the said alternating motion of the raster action.

The invented apparatus can also possess a unit for the production of a light field and/or an electrical field and/or a magnetic field. It is possible that the said fields can be static or dynamic fields, in which interactive cases a back-and-forth operation between the static and the dynamic effects can be proposed.

The said resilient element, which can advantageously be provided, could be a spring which would have a length within a range of 1 to 400 micrometers, this being combined with or being itself an elastic or cantilever extension.

Further, provision has been made, that the control device would have the capability of so regulating the resilient element, that the measuring probe can be adjusted to a predetermined amplitude of vibration. For example, amplitudes in a range between 0.1 or 2000 nanometers could be selected.

Additionally, the invented apparatus can include a force producing unit, which can be assigned to the measurement device and/or to the control device.

In such an arrangement, the possibility exists that the control device is automatically able to so regulate the force producing unit, that changes for the active quality factors (Q-factors) of a probe can be carried out, so that corresponding forces can be directed to the said resilient element.

An employment of the said force producing unit is especially advantageously favored, if a probe is set into a predetermined vibratory state. For the determination of the vibratory changes of the measuring probe, it is possible to so adjust the evaluation unit to detect such changes in the form of resonance displacement and/or alterations in amplitude and/or phase shifting.

In the case of an additional embodiment, the measurement apparatus possesses a probe positioning unit, which has the purpose of positioning a probe along all axes for translation or rotation of its occupied space. In this arrangement, provision has been made that the control device has the ability to automatically position and/or move the said probe by regulation of the said positioning unit for the attainment of predetermined probe positioning parameters.

In a case of the application of probe positioning unit, the proposal is to make use of probe positioning parameters, which include the following:

movements of the measuring probe for the rasterized scanning of the sample which has been placed on the sample-carrier, whereby such movements embrace lateral displacements and/or displacements in a range between 0.1 nanometers and a few millimeters, preferably in a range between 0.1 nanometers and 500 micrometers, movements of the measuring probe in a vertical direction, whereby provision encompasses such displacements as might lie in a range between 0.01 nanometers and 50 micrometers, movements of the measuring probe in a vertical direction, where concern is extended to a predetermined minimal separating distance between the measuring probe and the sample, wherein the possibility exists, that a separating distance regulation, for example a PID and/or a phase-logic-regulator is used for the control of the said movements, a maximal duration of time for a contact of the measuring probe with the sample which is situated on the sample-carrier, a maximal repetitive frequency of contacts of the measuring probe with the sample which is placed on the sample-carrier of the said probe, a maximal and/or an minimal measuring probe speed for the movements of the measuring probe relative to the sample placed on the sample-carrier of the said measuring probe, a maximal and/or a minimal separating distance between the measuring probe and the sample placed on the sample-carrier of the said measuring probe, a predetermined, force, which is held constant, and which acts between the measuring probe and the sample placed on the sample-carrier of the said probe, which, as an example, can lie in a range between 0.1 and 3000 pN, a maximal and or a minimal tension of the measuring probe, which tension is exercised against the sample on the sample-carrier of the said probe, a maximal and/or a minimal compressive force of the measuring probe, which force is exercised against the sample on the sample-carrier of the said probe, a maximal and/or a tensile force which acts upon the sample-carrier of the said probe, a maximal and/or a minimal compressive force change for the compressive force of the measuring probe onto the sample-carrier of the said probe, a maximal or a minimal shearing force of the measuring probe exercised against the sample which is on the sample-carrier, and/or a maximal or a minimal shearing force change rate for the shear force exercised by the measuring probe against the sample placed on the sample-carrier of the said measuring probe.

In the case of another embodiment a first detector unit is provided, which detector has the capability of determining the positions of a probe, and/or the movements of a probe, favorably also the deviations thereof, and/or, in a regular manner, also the forces acting on a probe, that is, regular in the manner of being repetitive with a frequency of some ten or some hundred kHz. In this arrangement, the control device, advantageously, is adjusted to automatically regulate the first detector unit in accord with predetermined detection parameters.

Advantageously, the first detector unit encompasses position sensors to determine position and or motion conditions of a probe. In the way of explanation, it is possible the LVDT-sensors, expansion measuring strips, optical sensors, interference sensors, capacity sensors, can be used for this purpose. Particularly advantageous is an optical beam diversion detector for the determination of the deflection of a probe.

Further, it is considered advantageous, that on the base of the first detector unit, immediately placed data on the positioning control and/or the motion control of a probe and/or the sample under one or more closed regulation circuits is available. For this purpose, provision is made, that the first detector unit, at least in this consideration, is connected with the control device.

Provision is also made, that the control device is enabled to control the first detector unit, in accord with predetermined detector parameters, which include:

a preset detection rate, in respect to single, multiple and/or all sizes to be captured, and/or a sufficient limit of instances, within which the first detector unit can carry out determinations of position, motion and/or forces.

Advantageously, the evaluation unit has the ability to evaluate the values determined by the first detector unit. This can be done either by analytical methods or in a statistical manner.

The evaluation unit can be so designed, that values obtained by the first detector unit can be classified. When this is carried out, it is preferred, that classified values, that is the data available from the evaluation unit, which have been obtained as described above, be returned into the measurement process, for example, in order to identify special parameters sets of the measurement procedure.

In accord with an additional embodiment, the measurement apparatus includes the sample-carrier positioning element, in order that the positioning of the sample-carrier is precisely executed. In this way the control device can be so adjusted, that the sample-carrier can be automatically positioned by means of the regulation imposed by the said sample-carrier positioning element. This regulation or control would be carried out in accord with preset sample-carrier positioning parameters, while the sample-carrier is being set in position or is being moved.

Advantageously, sample-carrier positioning parameters are to meet the following requirements:

1) placement of the sample-carrier at the rastered point of the sample affixed to the sample-carrier by means of a probe, whereby lateral movements can be made and/or placement with a precision in a range between 0.1 and 500 micrometers, 2) a maximal time period for the duration of a contact of a sample placed on the sample-carrier by the measuring probe, 3) a maximum number of times for contacts of the sample placed on the sample-carrier by a probe, 4) a maximum and/or a minimum sample-carrier speed for movements of the sample-carrier relative to the measuring probe, 5) a maximum and/or a minimum separating distance between the sample placed on the sample-carrier and a probe, 6) a predetermined force, which is to be maintained as a constant, which, for example is found in value to be between 0.1 and 3000 pN, and which force acts between the sample placed on the sample-carrier and the measuring probe, 7) a maximum and/or a minimum tension exercised on the sample placed on the sample-carrier by means of the measuring probe,
8) a maximum and/or a minimum compressive force exercised on the sample placed on the sample-carrier by means of the measuring probe,
9) a maximum and/or a minimum tension force rate of change for a tensile force acting upon the sample placed on the sample-carrier by means of the measuring probe,
10) a maximum and/or a minimum rate of change for a compressive force acting upon the sample placed on the sample-carrier by means of the measuring probe,
11) a maximum or a minimum rate of change of a tensile force acting upon the sample upon the sample-carrier by means of a probe, and finally,
12) a maximum and/or a minimum rate of change for a shearing force acting upon the sample placed upon the sample-carrier by means of a probe.

Advantageously, the sample-carrier positioning element can be a piezo electrical actuator and/or a linearly active drive, which, for example, can be a voice-coil drive.

The above mentioned embodiments of the sample-carrier positioning element are designed to produce a very precise positioning and/or movements of the sample-carrier. The sample-carrier positioning element can also be so designed, that "rough" positioning and/or movements of the sample-carrier become possible. This would be true particularly in a range between 100 nm and 30 cm. The advantage of such the sample-carrier positioning element, having, as said, "rough" positioning, is to be found in that previously determined positioning and larger movements can be quickly carried out. Exact positioning and movements can then be subsequently applied.

Advantageously, positional and/or movement detecting sensors can be included in the said sample-carrier positioning elements, which sensors, for example, by means of a closed regulation circuit can make available information for control of the sample-carrier positioning element. During such an operation, the above mentioned position sensors and/or additional sensors can be employed.

Advantageously, the measuring system includes the sample chamber, into which a liquid is introduced, with which liquid the sample to be placed on the sample-carrier is to be immersed. In this matter, where "immersed" is concerned, one is to understand, that at least the area of the sample, which is under investigation, is immersed in fluid, for instance, at least a certain surface of the sample is to be so wetted. In this way, the control device is enabled to monitor or to be adjusted for, the individual characteristics of the given parameters of the fluid so employed.

As fluid parameters can be named:
a predetermined temperature,
a predetermined temperature curve,
a predetermined pH value,
a predetermined pH value curve
a predetermined electrolyte content,
a predetermined electrolyte content curve,
a predetermined flow,
a predetermined change of flow,
a predetermined volume level of flow, and/or
a predetermined number of biological and/or chemical markers or properties.

By means of the use of a predetermined number of biological or chemical properties as fluid parameters, it is possible that a number thereof can be selected for use as fluorescence markers and or radioactive markers. Advantageously, markers are employed which function in chemical or biological manners and can exhibit selective characteristics of the sample to be investigated.

In the case of an additional embodiment, feeding equipment is provided, by means of which a fluid, which is to be added (for example, a fluid or fluids such as a buffer or a reagent) can be made available. With this feature, the control device can be designed in such a way, that the said feeding equipment is automatically supervised and, if required, can be so controlled, that for the selected auxiliary fluid predetermined side effects, preferably even their desired compositions, can be brought about as a continuing condition in the sample chamber. In the way of example, reagents can be automatically combined with one another, in order that fluid parameters such as the pH value and the like can be attained in the final mix.

Advantageously, the feeding equipment allows the entry of fluid to the sample-carrier in that area, in which during the measurement procedure, the sample is placed. Further, again in a favorable manner, the arrangement allows that the feeding equipment is also automatically controlled by the control unit.

The feeding equipment can include as its active agent, for instance, an individual or a multichannel pump.

For the monitoring of the fluid in the sample chamber and/or to aid in the current side effects of a given fluid, a second detector unit can be supplied. In this case, to react to the level of fluid registered by the second detector unit, the first feeding equipment can be automatically controlled.

Advantageously, a temperature enclosure is included in the analytic system. This embraces at least both a probe and the sample-carrier. In addition, provision is made so that the temperature enclosure is also an additional component of the measurement equipment, such as, for example, if one be available, the force producing means, a probe positioning unit, the sample-carrying unit positioning element, the sample chamber, the first feeding equipment and/or the second feeding equipment, which is described in the following. In the case of the second feeding equipment, advantageously the control of the temperature enclosure by means of the control device is carried out in accord with the previously described methods shown above.

Advantageously, in this arrangement, provision is further made, that the control device is so enabled to regulate the temperature enclosure, that a predetermined temperature is maintained therein and/or at least a predetermined curve of temperature change will be followed. For example, it is possible, that the control of the temperature enclosure is so carried out, that the duration of constantly maintained temperature can be replaced by other durations, in order that it may coincide with desired temperature curves.

Especially, preference is given to the fact that the raster microscopic measurement equipment is a force microscopic measurement equipment, advantageously for the recording of force separation curves. From this, it is possible that information regarding interactive activity and connection forces of individual molecules can be achieved.

Further advantage is gained, in that the measurement apparatus encompasses, in addition to the above, an optical detector unit, preferably such a device based on fluorescence and/or transmitted light conducting microscopic technology (such as DIC and/or phase contrast, of a bright or dark field technique).

The above purpose can also be achieved by means of the invented procedure for the execution of a raster probe microscopic measurement. The invented procedure, as well as the preferred embodiment examples of the same are defined in the claims designated for the said procedure.

BRIEF DESCRIPTION OF THE DRAWINGS

In the following description, preferred embodiment examples are used as explanatory models for the attached drawings. There is shown in.

DESCRIPTION OF ADVANTAGEOUS EMBODIMENT EXAMPLES

Figure 1:
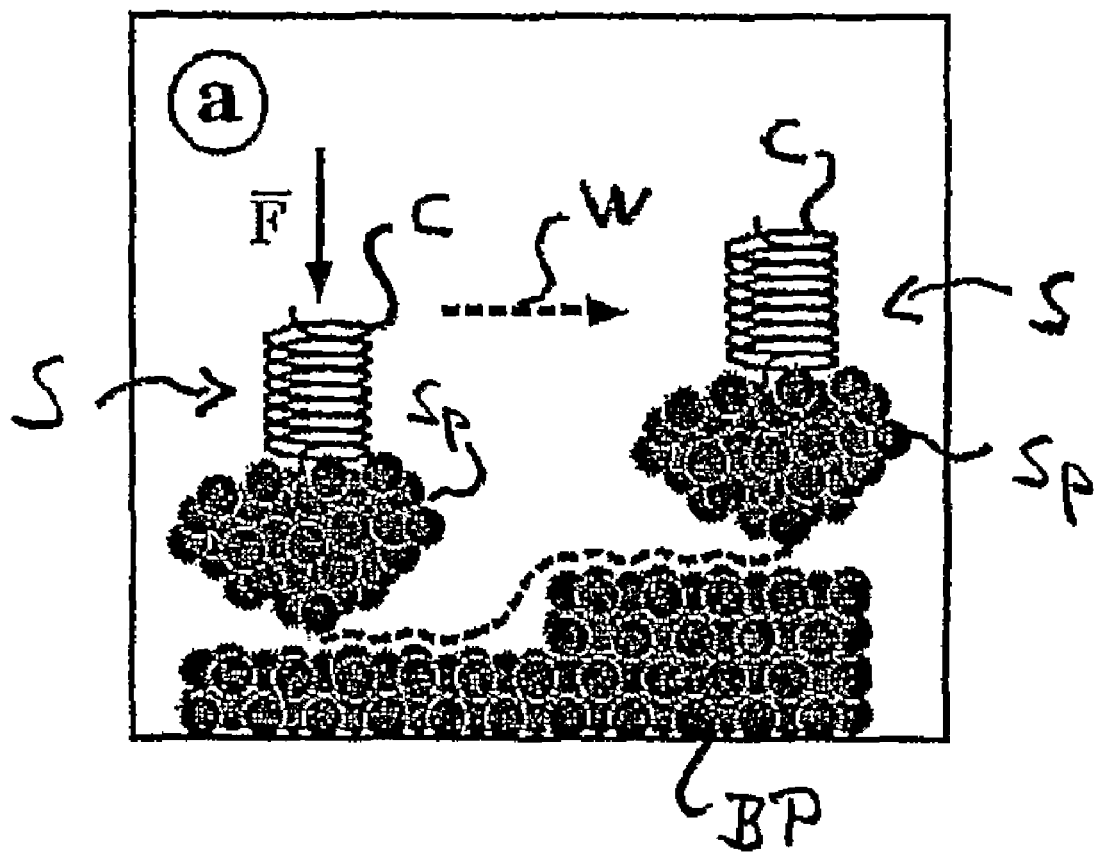
FIG. 1 a schematic presentation of the principle of a raster force microscope (AFM)
Figure 2:
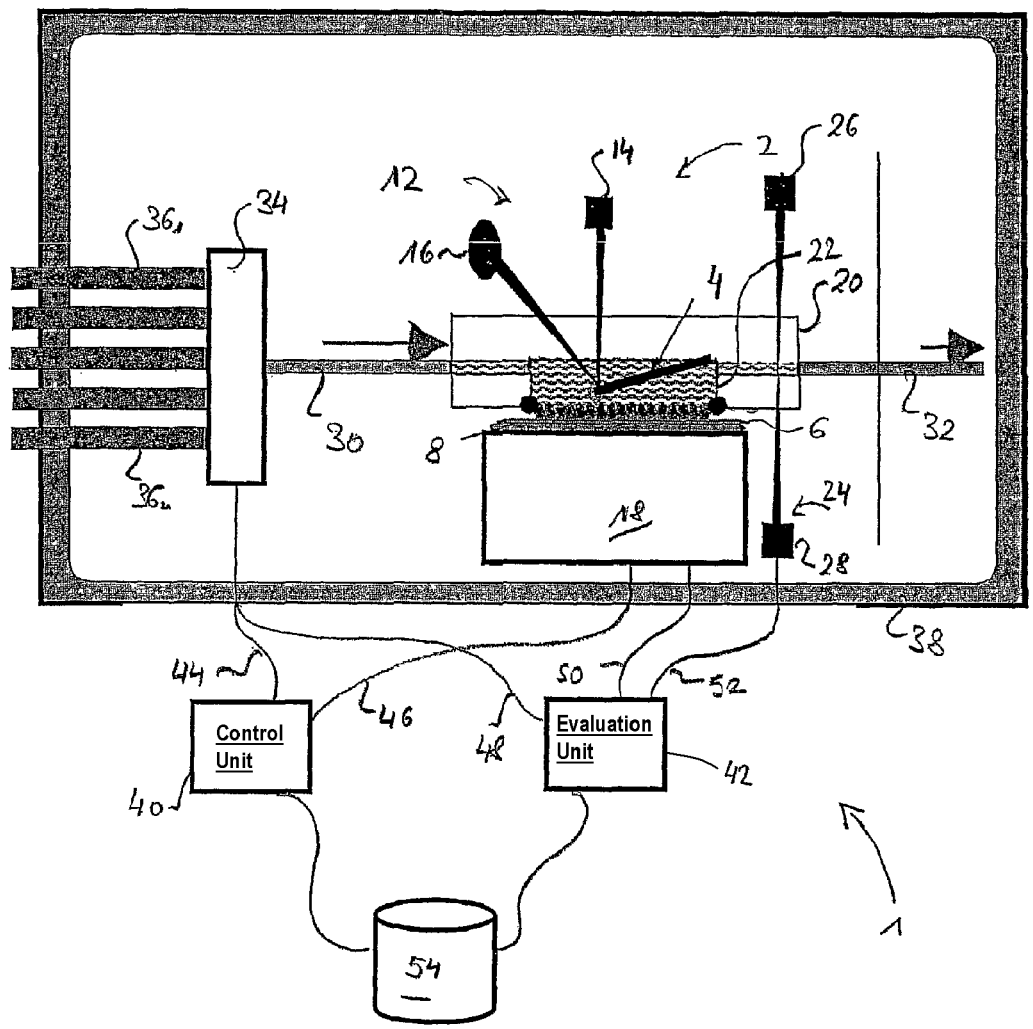
FIG. 2 a schematic illustration of an embodiment example 1 of the invented apparatus for raster probe microscopy, and FIG. 3 a representation of a probe placement intended for use in the invented apparatus.

As is shown in FIG. 2, the embodiment example 1 embraces a raster probe microscopic measuring apparatus 2, exhibited, somewhat, as an atomic-force, microscopic measurement apparatus (AFM) which includes in its composition a measuring probe 4 for raster force microscopic or force microscopic measurements and the sample-carrier 6, upon which sample-carrier a biological sample 8 may be placed for the carrying out of an analysis.

The measuring probe 4 is designed as a cantilever extension, which cantilever serves to allow resilient properties to the said probe 4. At the free end thereof, in particular, at the tip of the cantilever a probe (not shown) can be integrated as a unified component. The presentation in FIG. 2 principally shows a probe. In any case, this probe is shown as "probe 4" to be used within the measurement apparatus 2.

In particular, the measurement apparatus 2 can possess two, four, six or eight probes. The number of probes 4 can extend itself even to 100 or more. To incorporate this extended number of probes 4 to be used within the measurement apparatus recourse may be made to the use of the so-called "cantilever chips" (see FIG. 3).

Figure 3:
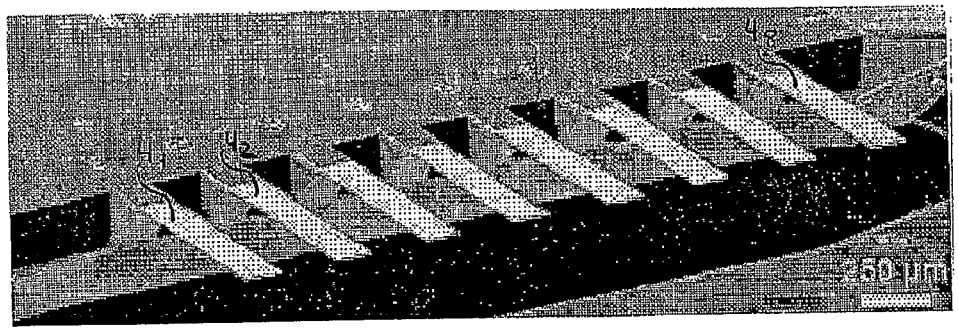

FIG. 3 shows an electron-microscopic photograph of a set of cantilever chips, which pictures eight spring-like units, $4_1$ to $4_8$ in that type of construction. Within the framework of nanotechnological installation practices, such chips supported by a hundred or more cantilevers are possible.

Giving consideration to the sample to be analyzed and relative to the current analysis being carried out, it can be necessary to set a probe into vibration at a predetermined amplitude. For this reason, the measurement apparatus includes a force producing unit which coacts with the measuring probe 4 and with the resilient unit. This force producing unit is not illustrated. The force producing unit, however enables the measuring probe to move in such a manner, that a desired quality-factor (hereinafter "Q-factor") appropriate to the analysis can be achieved.

Additionally, with measurement apparatus possesses the sample positioning device 18 (not shown in detail), which serves the purpose of positioning a probe 4 in relation to the sample 8. Relative to the characteristics of the sample 8 to be analyzed, as well as relative to the analysis itself, it is possible that by means of the sample positioning device 18, a probe 4 can assume a correspondingly appropriate position relative to the sample 8 and likewise follow a desired path thereon.

By means of a first detector unit 12, which is included in the assembly of the measurement apparatus 2 or, otherwise, is assigned thereto, it is possible that the positions and travel paths of the sample 8 can be determined. The first detector unit 12 is made as an optically based detector and encompasses a source of radiation 14, which can be a laser beam emitter, and includes further a light first receiver 16 which collects the light from the said radiation source 14 after its interaction action with a probe 4. The said radiation source 14 targets a probe 4, particularly in the area inclusive of the free ends thereof, while interactive actions, specifically here reflections of the light from the light source 14, are collected by a second receiver 16. These collected reflected light rays are then conducted to the evaluation unit 42 for the determination of positioning and movements of the measuring probe 4.

The measuring apparatus 2 possesses further the sample-carrier positioning element 10, which allows the said sample-carrier positioning element to be integrated in, and be come available to, the said measuring apparatus 2, thus being a component thereof The sample-carrier 6 and the sample-carrier positioning unit 18 can also be designed a as separate and discrete components.

The sample-carrier positioning unit 18 here provided is actuated by a piezo-electrical electrical element, which energizes the movements and positioning of the sample-carrier 6 and therewith the thereon superimposed measuring probe 8 in its relative space.

The sample chamber 20 encapsulates the measuring probe 4 and the sample 8 or encloses at least that area of the sample 8 which is to be analyzed, for example, this said area can be the upper surface thereof. The sample chamber 20 is closed in a fluid tight manner, absent the in and out lines, which lines are described in the following, and on this account presents a closed-off space in relation to its ambient surroundings. The sample chamber 20 can be totally dedicated to the acceptance of incoming fluid or as is shown in FIG. 2, a fluid chamber 22 can be provided, which is so designed, that the measuring probe 4 and the sample 8 or more precisely, those areas thereof which are to be analyzed, are immersed in fluid.

By means of a second detector unit 24, the level of fluid in the sample chamber 20 can be determined. The second detector unit 24 is designed as an optical measuring instrument, which includes in its assembly a light source 26, for instance, this being a laser beam emitter and a receiver 28. The light from the said laser source 26, after its interaction with the fluid in the sample chamber 20 is collected by the receiver 28. Readings in regard to the level of the fluid in the sample chamber 20, which readings are activated by the received laser light are possible to obtain.

The sample chamber 20 is connected with a feed line 30 by means of which, fluid can be introduced into the sample chamber 20. By means of a discharge line 32, fluid from the sample chamber 20 finds an outlet from the said sample chamber 20.

The input side of feed line 30 is connected with a feed unit 34, by means of which the individual, combined, mixed and blended fluids of the input line 30 can be introduced into the sample chamber 20. The feed unit 34, for this purpose, includes one or more pumps or multichamber pumps and apparatuses (not shown) for the mixing and blending of the said fluid mixtures. By means of the fluid supply lines $36_1 \ldots 36_n$ the feed unit 34 obtains various fluids from their appropriate reservoirs (not shown). In the case of embodiment 1, which is the total diagram of FIG. 2, by means of the supply unit 34 fluids, which are desired, and so approved by an analysis of the sample 8 and/or necessary fluids are introduced, such as, for example buffer solutions and reagent materials.

The measurement apparatus 2 and the additional, above described components of the embodiment—absent the fluid sources connected with the supply lines $36_1 \ldots 36_n$ and parts of the supply lines $36_1 \ldots 36_n$—are housed in a temperature controlling enclosure 38. This temperature enclosure 38 possesses, at least where temperature is concerned, a temperature directed closure against the ambient environmental conditions.

The embodiment form 40 serves for the control of the components which find themselves housed within the temperature enclosure as well as the conditions of the temperature enclosure itself. In FIG. 2 are presented the line connections 44 and 46 which represent required interconnections between the control device 40 and the feed unit 34, as well as connections for sample-carrier positioning element 18.

The evaluation unit 42 contains principally all components which are confined within the temperature chamber 38, insofar as such components are designed to be so enclosed. Further, the said evaluation unit also obtains from the temperature enclosure 38, data, measurement signals, and the like, in order to transmit and evaluate the actual operational conditions, i.e., the actual results, obtained from the said measurements. Representing the connections which permit the above operation, FIG. 2 shows connection lines 48, 50 and 52 between the devaluation unit 42 and the feed unit 34, the sample-carrier positioning element 18 and the second detector unit 24.

Further, the embodiment designated as 1 encompasses a data storage memory 54, which is connected to the control device 40 and the evaluation unit 42. The data storage memory 54 serves for the storage of data, measurement signals, and the like, which have been obtained from the evaluation unit. These data are available from the evaluation unit 42 along with parameters, which can be used by the control device 40 for the regulation of the said embodiment 1. These and other data are so stored, in accord with the following described information:

In particular, the data storage apparatus 54 is so designed, that it may also be employed as a data bank, in which storage is provided for already evaluated data and for outside data which has a relation to the embodiment 1.

In the case of the execution of a raster probe microscopic measurement, the control unit regulates, besides the true force-spectroscopic experiment, also all experimental conditions, such as temperature, the active pH value of the sample 8, the coacting electrolyte(s) of the sample 8 as well as the supply of pharmaceutical, biochemical and chemical additives. Further the control device monitors the control device 40 for predetermined operational points of time, also checks the again predetermined duration periods or active parameters for the on-going measurement and also supervises the side conditions and finally controls the measurement in such a manner, that specifications intended for that measurement are held.

The evaluation unit 42 analyzes the force-spectrum acquired by a probe 4 during the investigation in regard to sample 8 and is able to interpret this force-spectrum. Relative to this operation, the possibility also exists, that for example, upon the attainment of a preset value, the measurement then in course can be brought to a termination and a new measurement initiated with new specifications (for instance, ambient condition changes). The control device 40 and the available data from the evaluation unit 42 also enable iterative measurement cycles being carried out, in order that concurrent reactive effects are determined, which could enhance specified interactive operations.

During the measurement, a probe 4 is in a crisscrossing relationship with the sample 8, whereby, in the presence of interactions between a probe 4 and the sample 8, (biological) molecules situated on the surface of the sample 8 can be detected. Relative to the formulation of the measuring probe 4 and the type of sample 8, defined contact duration times and/or frequencies of contacts between a probe 4 and the sample are required. These parameters are applied and adjusted by the control device 40, which also supervises and if necessary corrects the ongoing procedure. In this matter, it can be advantageous, especially in the execution of a completely automatic measurement, to prepare the sample 8 to an optimum condition. More detailed methods for this preparation are to be found in the following description.

During the measurement procedure, the control device 40 regulates a plurality of relevant experimental conditions, such as, for example, maximum/minimum tension and compressive forces between a probe 4 and the sample 8, also the speeds with which the relative movements between a probe 4 and the sample 8 are carried out, likewise, the number of measurement points (resolution) and the maximum/minimum separating distances between a probe 4 and the sample 8.

As this is done, it is possible to proceed with the measurements, by means of which individual, several or all experimental conditions are held constant and/or may be systematically and/or chaotically changed. Thus it is, for example, possible to execute a measurement in which, except for the travel speed of a probe 4, all experimental conditions are held constant.

As soon as a predetermined number (for example, a thousand) of measurements have been undergone by a single sample, it is possible to send the acquired data to a data set. Additional data sets can be made by means of changed experimental conditions, and then comparisons can be carried out. This makes it possible to analyze different biological and/or medicinal relevant experimental conditions in regard to their influence on molecular interactivity.

A given value, which can influence the analyses of biological samples, would be thermal alterations.

The said temperature enclosure 38 is provided in order that thermal drift during experimental conditions can be minimized. This might be, for example, changes arising from buffers coacting with sample 8. Further it is possible that a heating or a cooling element (for instance, a Peltier-element) can be employed, in order that the temperature of the sample 8 itself can be controlled. Such a heating/cooling element can, for example, be placed under the sample-carrier 6.

Bimolecular interactivities are, as a rule, very dependent upon the governing, physiological ambient conditions of the measurement. These, on this account, should be monitored during a measurement procedure and accordingly provided with control. In this way, during the measurement, the desired surrounding conditions are maintained, which, generally, stimulates the inherent properties of the sample 8. Thus, for example, provision is made, that during a measurement procedure, the liquid level of a buffer solution in the sample chamber 20 is monitored and controlled by means of the second detection unit 24 at predetermined intervals or is supervised continually and, if necessary, the supply equipment 34 is so operated, that a desired liquid level is correctly held or can be properly reached. In this way, it is possible, that during a measurement procedure a measurement of a lessening of the buffer level due to evaporation can be compensated for. In this way also, pH-variations as well as changes regarding the employed electrolyte or other materials which can interact with the sample 8 can be placed under monitoring supervision and, if required, also controlled. By means of an intended control of buffer solutions in the sample chamber 20, evaporation losses and salting-out occurrences can be avoided.

In the control of buffer solutions which are in the sample chamber 20, the possibility exists that fluid movements, that is, for example, a turbulence or swirling may occur, which can influence the accuracy of the measurement. For instance, fluid movements in the sample chamber 20 can activate vibratory resonances in the measuring probe 4. In order to prevent this, provision is made, to the effect that the control device 40 interrupts a procedure which is already in operation, if such disturbances are detected and/or predicted.

The speed, with which a measurement can be carried out with, plays an essential role. In any case, quickly executed measurement procedures are subject to question. In order to achieve a high degree of quality and at the same time perform a measurement in a short time, the invention allows, that the measuring probe 4 can be moved with a greater than normal speed and likewise quickly assume a desired position. When this occurs, then provision is made, that during a measurement procedure, as measurements are taken at different and/or the same points, different speeds for the movement and/or positioning of a probe 4 may be employed. This control of varying speeds and/or positioning enables, in the case of force spectra (i.e. curves of force-intervals) permits the acquisition of detailed, automatic reporting in regard to molecular interactions. In addition in this way, measurements are optimized, in that the resolution, with which the force-spectra were acquired, is increased. This situation can be achieved, in that even the smallest force, which lies within the detection capability of a probe 4, can be minimized. The smallest detectable force depends on, among other conditions, the resilient properties of the measuring probe 4. In order to capture the smallest possible, detectable force, it is advisable to make use of such probes, which exhibit the greatest degree of spring-related characteristics and which show a high resonance-frequency.

A further possibility exists, in increasing the tractive velocity of a probe 4. High speeds of movement can induce special hydrodynamic turbulences, which in turn create undesirable displacements of the measuring probe 4. As a result, in a case of selected high speed operations, undesirable noise reactions can be infused into measurement data, whereby the sensitivity for the said lesser forces between a probe and the sample 8 is diminished. This disadvantage can be avoided, by the use of probes, which possess the shortest possible length along with a minimum expanse of elasticity therein. Such probes exhibit, in comparison with conventional probes, a clearly superior hydrodynamic character and permit obviously increased tractive speeds. In any case, such probes deflect from their chosen paths to a lesser extent that the conventional probe. On this account, the detector unit 12, in the invented case, can be designed as the greatest possible, optical assembly with special optical features.

In order to carry out raster probe, microscopic measurement along with static measurements, a probe 4, during the operation of a measurement, is set into vibrations of low amplitude, namely 0.1 to 10 nm. A difficulty related to dynamic raster probe, microscopic measures, can be found therein, in that governing low quality factors (Q-factors), which can be attributed to measuring probes 4 which are immersed in puffer containing solutions. Normally, molecular interactions can be captured by means of resonance displacement, possibly at the maximum possible value thereof and these can be determined by a probe. The resonance characteristics of a probe are proportional to the Q-factor, whereby a lesser Q-factor can lead to a broadly spread resonance maximum. On this account, a reduced sensitivity of the detection of force under circumstances of a reduced Q-factor can be brought about. Additionally, such characteristics evoked by (for example) hydrodynamic turbulence of fluid surrounding a probe or by the elastic action of a probe itself, (for instance, damping means) can contribute to dissipative interactions in the analysis. Accordingly, in the case of embodiment 1 (see FIG. 2), provision has been made to increase to increase the Q-factor in such a way, that by means of a positive feedback loop, an external force is applied to a probe 4. Thereby, it is possible, that the Q-factor can be improved by at least three times and often many time more, whereby the sensibility to force lies in the range of a few pN.

To obtain an automatic analysis from the results of measurement, provision is made, that during a measurement procedure, individual force-curves are made under the use of the evaluation unit 42. As far as obtaining statistical analyses, the procedure would be as follows:

To begin with, the force-curves are so compensated among themselves, that they can be compared with one another. This can be done, for example, by establishing a common unit separation along the zero line (reference value or abscissa) and/or by accordingly extending or compressing the given curves to match.

Thereafter, it is possible the entire measurement procedure can be statistically analyzed, in order that a determinative view may be obtained regarding proteins into the forces necessary for the probable apportioned degree of individual processes for folding and/or unfolding.

In addition, it is possible that the force-curves can be classified, viewed in real or supposed superimposition, and so determined as to characteristics. For the classification of force-curves, for example the length of the individual force-curve can be seen, and number and position of the therewith evident maximum forces can be determined. The length of a force-curve discloses the directions in which the expected interactions proceed. The number and positioning of force-maxima permit statements to be made in regard to the collective and/or individual results of interaction procedures. By means of a classification of force curves, it is possible that data, especially graphically illustrated data, can be obtained in regard to different interaction processes.

By means of an overview of class of classified force-spectra, the noise of the individual curves is reduced. Thereby the actual interactive procedures, which are illustratively disclosed by the force-curves, become obvious to the observer. In addition, statements about possible variations of the interactive procedures can be made, which statements are based on standard deviations from already determined force-curves.

Comparisons of interactive procedures, carried out at the same experimental conditions on samples under the same experimental conditions are made possible, when the following conditions are present:

a) a classification of force-curves,
b) a determination of force-curves of a common class,
c) interaction procedures which are related to or similar to one another, and
d) and a subsequent statistic analysis.

In this way, concerning the embodiment 1, three mutants of the same receptor, which differentiate themselves from one another in point-mutations, are identified by means of their interactive spectra and can be compared with one another. Also statements in regard to the effects of an input of mutations into local interactions of a protein as well as the interaction of the given protein or proteins with other molecules can be carried out.

By means of the data storage memory 54, it becomes possible to create a data-bank for force-spectra, in order, for example, to characterize typical interactive procedures of various samples under different experimental conditions. For access to a data bank of the data storage memory 54, provision is made to employ different search strategies. For example, the structure data of an unfolded protein can be used, in order that structurally related proteins can be localized and the characteristics of their unfolded outline can be compared. In order to compare different unfolded spectra, it is possible, by means of the evaluation unit 42, to evaluate data in the said data memory bank, in order that, for example, different force-spectra to superimpose on one another and thus to compare. This makes it possible, to make statements in regard to dependencies of interaction procedures where experimental conditions are concerned. Furthermore, interactive procedures of different samples can be judged, as to whether or not the stored data indicates that their interactive procedures are comparative, similar or have the same characteristics.

Further, provision has been made, that that databank access can be made in relation to the presence of forces, physiological dependencies, interactive spectra and experimental conditions.

The invention claimed is:

1. A device for raster probe microscopy with:
   a raster microscopic measuring apparatus, which possesses a measuring probe for raster microscopic measurements and a sample-carrier for the positioning of a sample, which sample is to be subjected to raster microscopic analysis;
   the raster microscopic measuring apparatus comprising a control unit, wherein the control unit controls the measuring apparatus in the execution of an automatic raster microscopic procedure in accord with predetermined control parameters;
   the raster microscopic measuring apparatus comprising an evaluation unit, wherein the evaluation unit evaluates measurements from the automatic raster microscopic procedure in accord with predetermined evaluation parameters;
   the measuring apparatus comprising a sample chamber for the acceptance of provided fluids into which a sample placed on the sample-carrier is to be immersed; and
   the control unit being designed to control at least one predetermined fluid parameter for the fluid, the at least one fluid parameter being at least one of the following parameters:
   a predetermined temperature,
   a predetermined temperature curve,
   a predetermined pH value,
   a predetermined pH curve,
   a predetermined electrolyte,
   a predetermined electrolyte curve,
   a predetermined flow,
   a predetermined flow curve,
   a predetermined level of fluid,
   a predetermined quantity of biological identifying features, and
   a predetermined quantity of chemical identifying features.

2. A method for the execution of a raster probe microscopic measurement comprising the following steps:
   the predetermination of at least one of the following sets of parameters (a) and (b) for measurement by the raster microscopic method:
     (a) control parameters, and
     (b) evaluation parameters;
   the placement of a sample to be measured by the raster microscopic method onto a sample-carrier positioned on a measurement apparatus for the use of a probe of the measurement apparatus;
   if the at least one set of parameters includes the set of control parameters (a), the measurement apparatus is automatically controlled in accord with the predetermined control parameters by a control unit; and
   if the at least one set of parameters includes the set of evaluation parameters (b), the raster microscopic measurement is automatically evaluated in accord with the predetermined evaluation parameters by an evaluation unit;
   wherein, in the case of an available fluid which is confined in a sample chamber of the measurement apparatus, into which fluid the sample is immersed, at least one fluid parameter of said fluid is automatically controlled by the control unit, the at least one fluid parameter comprising at least one of the following fluid parameters:
   a predetermined temperature,
   a predetermined temperature curve,
   a predetermined pH value,
   a predetermined electrolyte content,
   a predetermined electrolyte content curve,
   a predetermined flow,
   a predetermined change of flow,
   a predetermined fluid level,
   a predetermined quantity of biological features, and
   a predetermined quantity of chemical marker features.

3. A device for raster probe microscopy with:
   a raster microscopic measuring apparatus, which possesses a measuring probe for raster microscopic measurements and a sample-carrier for the positioning of a sample, which sample is to be subjected to raster microscopic analysis;
   the raster microscopic measuring apparatus comprising a control unit, wherein the control unit controls the measuring apparatus in the execution of an automatic raster microscopic procedure in accord with predetermined control parameters;
   the raster microscopic measuring apparatus comprising an evaluation unit, wherein the evaluation unit evaluates measurements from the automatic raster microscopic procedure in accord with predetermined evaluation parameters;
   the probe comprising a resilient unit, the evaluation designed to evaluate the forces which act upon the probe;
   a force producing element which coacts with the resilient unit; and
   the control unit automatically controlling the force producing element to regulate the Q-factor of the probe.

4. A device for raster probe microscopy with:
   a raster microscopic measuring apparatus, which possesses a measuring probe for raster microscopic measurements and a sample-carrier for the positioning of a sample, which sample is to be subjected to raster microscopic analysis;
   the raster microscopic measuring apparatus comprising a control unit, wherein the control unit controls the measuring apparatus in the execution of an automatic raster microscopic procedure in accord with predetermined control parameters;
   the raster microscopic measuring apparatus comprising an evaluation unit, wherein the evaluation unit evaluates measurements from the automatic raster microscopic procedure in accord with predetermined evaluation parameters;
   a temperature enclosure encasing the probe and the sample-carrier; and the control unit controlling the temperature enclosure in keeping with predetermined temperature parameters.

5. A device in accord with claim 4 wherein the control unit controls the temperature enclosure such that a predetermined temperature is maintained and a predetermined temperature curve is followed.

6. A method for the execution of a raster probe microscopic measurement comprising the following steps:
   the predetermination of at least one of the following sets of parameters (a) and (b) for measurement by the raster microscopic method:
   (a) control parameters, and
   (b) evaluation parameters;
   the placement of a sample to be measured by the raster microscopic method onto a sample-carrier positioned on a measurement apparatus for the use of a probe of the measurement apparatus;
   if the at least one set of parameters includes the set of control parameters (a), the measurement apparatus is automatically controlled in accord with the predetermined control parameters by a control unit; and
   if the at least one set of parameters includes the set of evaluation parameters (b), the raster microscopic measurement is automatically evaluated in accord with the predetermined evaluation parameters by an evaluation unit;
   wherein an appropriate force to enable the change of an effective Q-factor for the probe is directed to the probe under the control of the control unit.

7. A method for the execution of a raster probe microscopic measurement comprising the following steps:
   the predetermination of at least one of the following sets of parameters (a) and (b) for measurement by the raster microscopic method:
   (a) control parameters, and
   (b) evaluation parameters;
   the placement of a sample to be measured by the raster microscopic method onto a sample-carrier positioned on a measurement apparatus for the use of a probe of the measurement apparatus;
   if the at least one set of parameters includes the set of control parameters (a), the measurement apparatus is automatically controlled in accord with the predetermined control parameters by a control unit; and
   if the at least one set of parameters includes the set of evaluation parameters (b), the raster microscopic measurement is automatically evaluated in accord with the predetermined evaluation parameters by an evaluation unit;
   wherein a temperature enclosure, which encases the probe and the sample-carrier is controlled by the control unit under predetermined temperature parameters.

8. A method in accord with claim 7 wherein the temperature enclosure is so controlled, that a predetermined temperature is held constant or at least a predetermined temperature curve is followed.

* * * * *